United States Patent [19]

Ingold

[11] Patent Number: 5,159,904
[45] Date of Patent: Nov. 3, 1992

[54] DEVICE FOR ADJUSTING THE ANGULAR SETTING OF A DRIVEN SHAFT RELATIVE TO A DRIVING SHAFT

[76] Inventor: Alain F. C. Ingold, 8 rue Cernuschi, 75017 Paris, France

[21] Appl. No.: 458,742
[22] PCT Filed: Apr. 14, 1989
[86] PCT No.: PCT/FR89/00170
 § 371 Date: Dec. 11, 1989
 § 102(e) Date: Dec. 11, 1989

[30] Foreign Application Priority Data

Apr. 14, 1988 [FR] France .................. 88 04956

[51] Int. Cl.$^5$ .............................................. F01L 1/34
[52] U.S. Cl. ........................... 123/90.15; 123/90.17; 123/90.31; 474/110
[58] Field of Search ........... 123/90.12, 90.15, 90.17, 123/90.31, 508; 474/110, 134, 137

[56] References Cited

U.S. PATENT DOCUMENTS

| | | | |
|---|---|---|---|
| 3,888,217 | 6/1975 | Hisserich | 123/90.31 |
| 4,478,595 | 10/1984 | Hayakawa et al. | 474/110 |
| 4,533,341 | 8/1985 | Yokota | 474/110 |
| 4,715,333 | 12/1987 | Oyaizu | 123/90.31 |
| 4,850,941 | 7/1989 | Sosson | 474/110 |

FOREIGN PATENT DOCUMENTS

| | | |
|---|---|---|
| 1964005 | 6/1971 | Fed. Rep. of Germany . |
| 3509094 | 4/1984 | Fed. Rep. of Germany . |
| 3506107 | 8/1985 | Fed. Rep. of Germany . |
| 0143850 | 11/1981 | Japan .................. 474/110 |
| 0063338 | 4/1984 | Japan .................. 123/90.15 |
| 0079046 | 5/1984 | Japan .................. 123/90.15 |
| 0157397 | 7/1978 | Netherlands .......... 474/110 |
| 0651109 | 8/1985 | Switzerland .......... 123/90.31 |

Primary Examiner—David A. Okonsky
Assistant Examiner—Weilun Lo

[57] ABSTRACT

Device for driving at least one driven shaft A1, by means of a driving shaft V, comprising a closed-loop transmission connection for constant length defining a tight side BT and a slack side BM on which a first tightener T1 acts, characterized in that there is provided at least a second tightener T2 acting on the tight side and means for actuating said tighteners in synchronism. These tighteners are of the hydraulic type and the device has a particular application in the adjustment of the setting of camshafts or shafts for rotation of injection pumps in internal combustion or explosion engines.

11 Claims, 6 Drawing Sheets

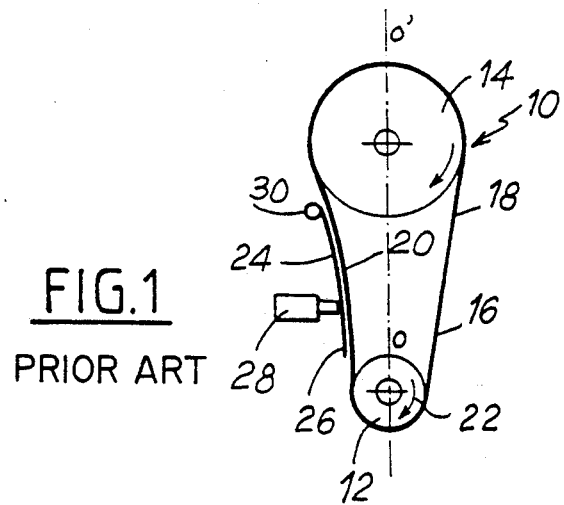
FIG.1
PRIOR ART
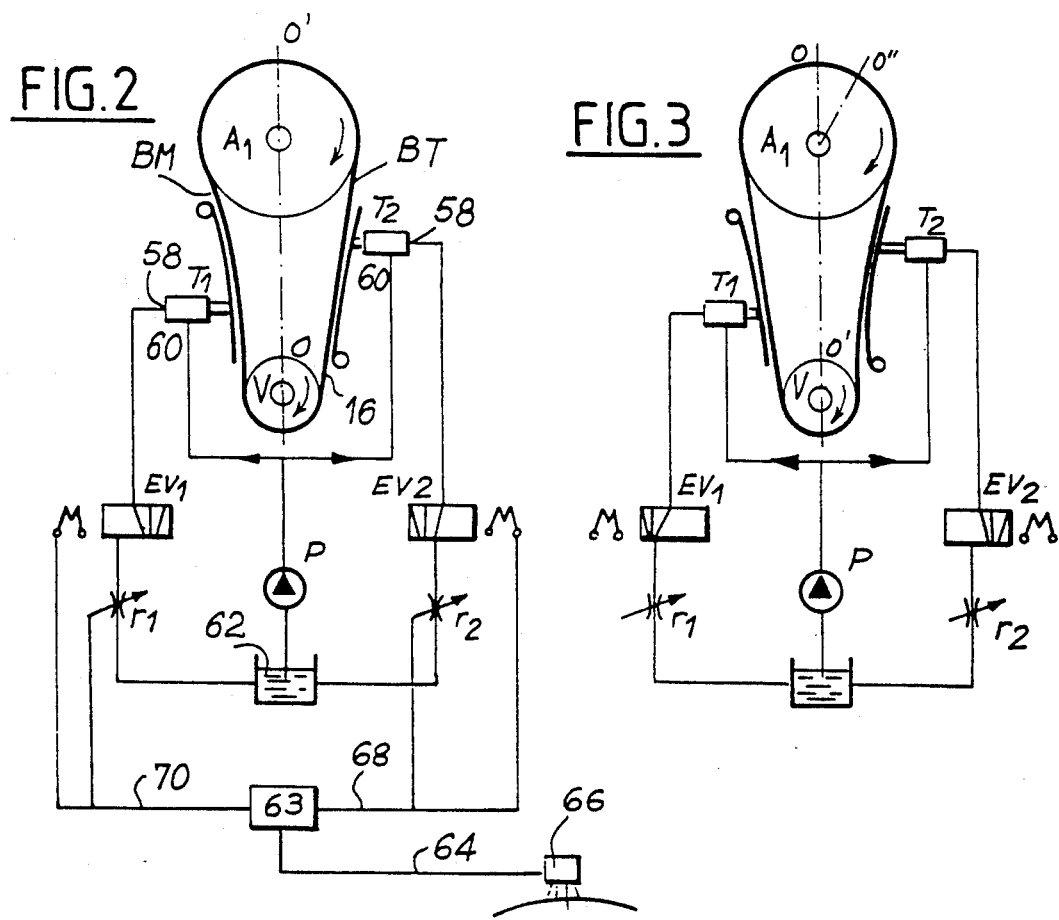
FIG.2
FIG.3

FIG. 8
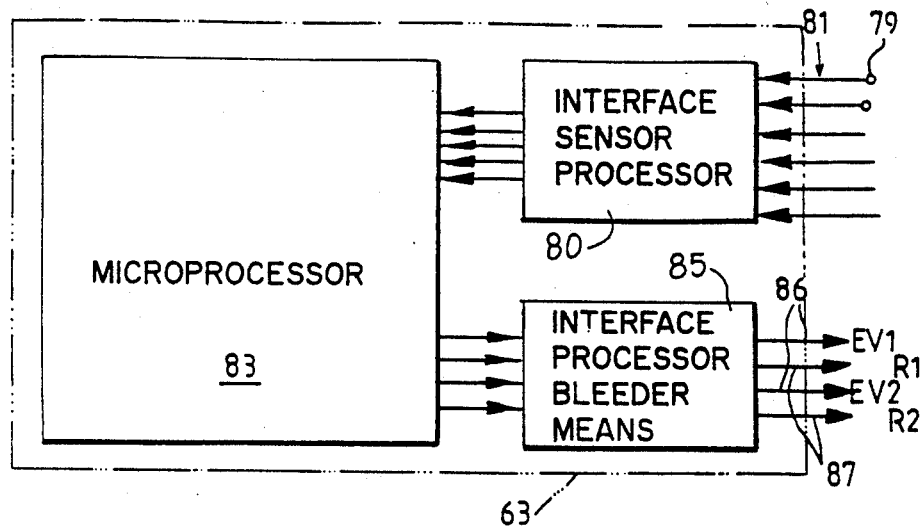
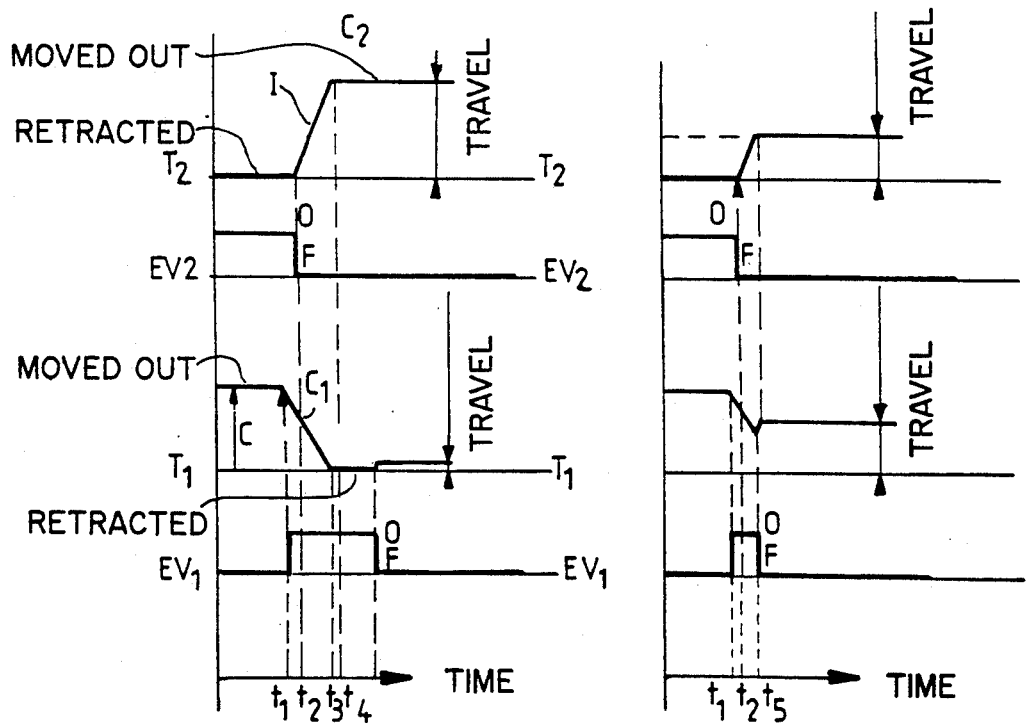
FIG. 9A        FIG. 9B

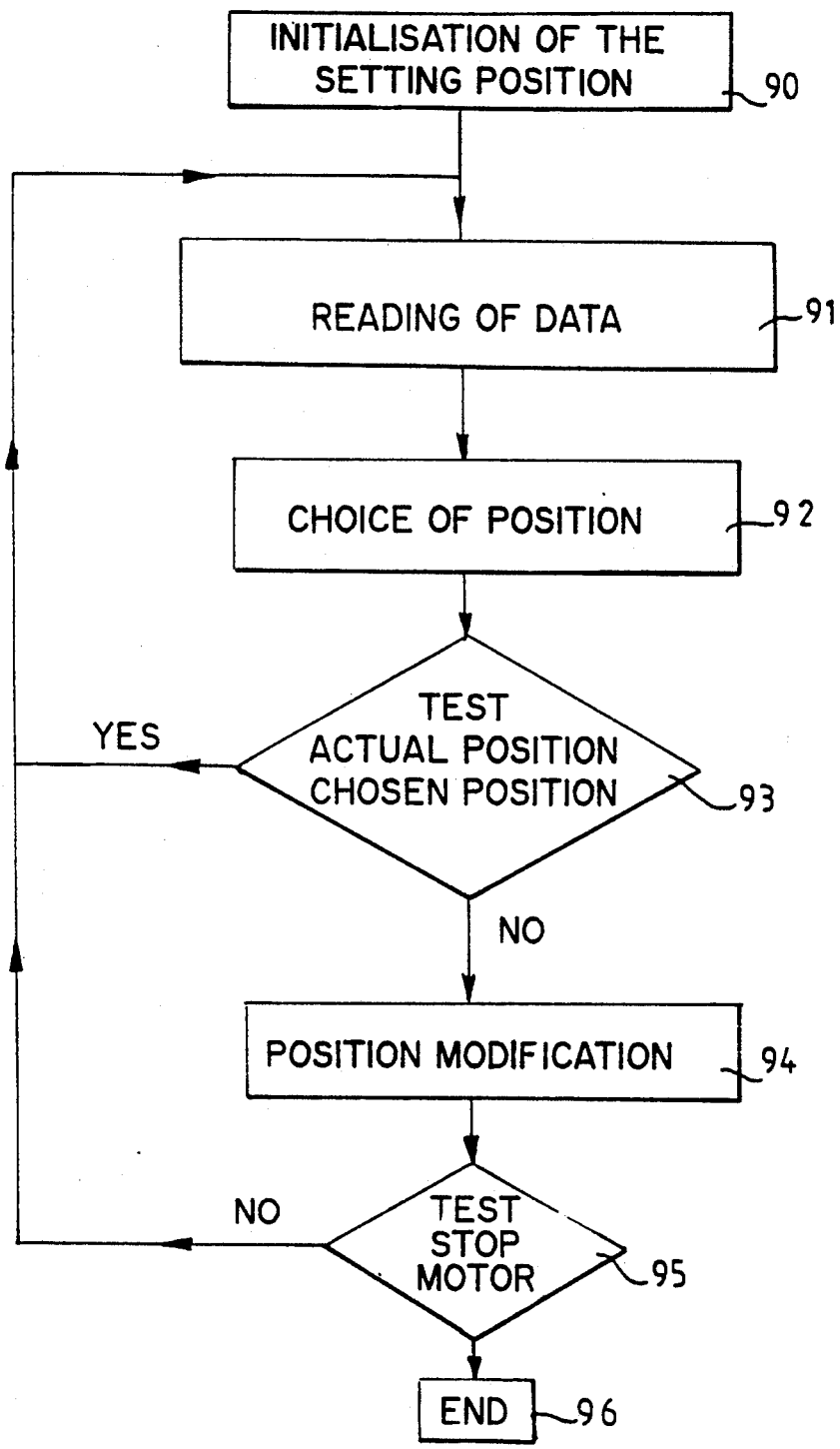

DEVICE FOR ADJUSTING THE ANGULAR SETTING OF A DRIVEN SHAFT RELATIVE TO A DRIVING SHAFT

The present invention relates to a device for adjusting the angular setting of at least one driven shaft relative to a driving shaft in an internal combustion or explosion engine.

In an internal combustion or explosion engine it is necessary during its operation to ensure a synchronism in particular of the control of the opening and closing of the valves and/or the injection with the movement of the pistons. This synchronism is generally obtained by means of a chain, termed a timing gear chain, which, as it is driven in rotation by a chain wheel rigidly connected to the crankshaft, itself drives either a camshaft ensuring the opening and the closing of the valves, or an element of an injection pump.

A chain tightener ensures the tension of the chain and takes up play due to wear.

It is moreover known that it is of utility to be able to vary the angular setting of the driven shafts relative to the driving shaft as a function of the engine operating condition. Such a variation permits improving the efficiency and reducing pollution due to a discharge of incompletely burnt gases.

The adjustment of the angular setting of the shaft controlling the opening and closing of the valves has been dealt with in the prior art and more particularly in the French patent 2529617 which prescribes for the setting of the distribution and/or the injection, a shaft whose angular position may be adjusted by means of a train of meshed helical gear pinions.

In other devices, the pinion driving the camshaft is constituted by a hub rigidly connected to the camshaft and a ring gear disassociated from the hub and connected to the latter either by a hydraulic coupling or by a planet gear mechanism so as to be capable of achieving an angular offset between this ring gear and the hub connected to the shaft.

These known devices have many drawbacks among which is the complexity which renders them hardly reliable and of high cost. Moreover, they have a large overall size whereas the regions in which they must be located are restricted.

Such devices also have an important drawback, namely of being difficult to control. Indeed, they permit varying the setting of the driven shaft relative to the driving shaft between two end positions without possibility of obtaining intermediate positions.

An object of the present invention is to propose a method for adjusting the angular setting of at least one driven shaft driven in rotation by a driving shaft in an internal combustion engine, which is of simple construction, reliable in operation and consequently overcomes the drawbacks of existing devices.

For this purpose, the invention provides a device for driving at least one driven shaft by means of a driving shaft, comprising a closed-loop transmission connection of constant length defining a slack side on which a first tightener acts and at least one tight side on which a corresponding tightener acts, characterized in that the tighteners are hydraulic tighteners having a valve each including a chamber continuously fed with a control fluid under pressure and provided with bleeder means controlled by a sequential control unit for varying the angular setting of the driven shaft relative to the driving shaft.

Such a device permits obtaining an adjustment of the angular setting in particular of a camshaft relative to a crankshaft in an internal combustion or explosion engine in a simple, reliable and precise manner with a small overall size, since the device is located between the different rotating shafts.

According to other characteristics:

the bleeder means of each tightener comprise an electrically-operated valve EV on the downstream side of an outlet of the chamber and a variable throttle R located on the downstream side of the electrically-operated valve and on the upstream side of a bleeder reservoir.

the control unit comprises an inlet connected to sensors of parameters of operation of the engine, a microprocessor and an outlet delivering control signals to the bleeder means.

the control unit sends in a sequential manner control signals to the bleeder means which open first of all the electrically-operated valve EV1 of the side or sides to be shortened then, by closing the electrically-operated valve EV2 of the side or sides to be elongated, then by re-closing the previously-opened electrically-operated valves, for fixing the setting in the desired position, and, by adjusting during the sequence of opening of the throttle or throttles, for adjusting the rate of shortening of the side or sides to be shortened.

the sensors connected to the control unit comprise sensors of torque, speed, pressure in the inlet pipe, temperature of the exhaust gases, content of nitrogen oxide or other products.

the driven shaft A1 is a camshaft or a shaft driving an injection pump in rotation.

the closed loop connection is a roller chain cooperating with chain wheels carried by the shafts A.

the closed loop of constant length is a belt cooperating with pulleys.

the belt is toothed and the pulleys are toothed.

the fluid under pressure controlling the tightener is the lubricant under pressure of the engine and the bleeding is effected by return to the sump of an internal combustion or explosion engine.

the fluid under pressure controlling the tighteners is a fluid distinct from the engine lubricant and the bleeding is effected by return to an independent sump of the internal combustion or explosion engine.

The invention will now be described in more detail hereinafter with reference to the accompanying drawings in which:

FIG. 1 represents a device comprising a driven shaft and a driving shaft driven by the same connection of constant length, as is known in the prior art;

FIG. 2 represents diagrammatically, in a first position, a device for adjusting the angular setting of a driven shaft relative to a driving shaft, according to the invention;

FIG. 3 represents such a device in another position;

FIG. 8 represents diagrammatically the elements making up the electronic control of the bleeder means;

FIGS. 9A and 9B represent the changes in the position of the electrically-operated valves EV1 and EV2 and of the tighteners T1 and T2 in two sequences of the offsetting of the angular setting of the driven shaft relative to the driving shaft;

FIG. 10 represents the flowchart describing the operation of the program of the microprocessor contained in the electronic control of the bleeder means.

Figure 4B:
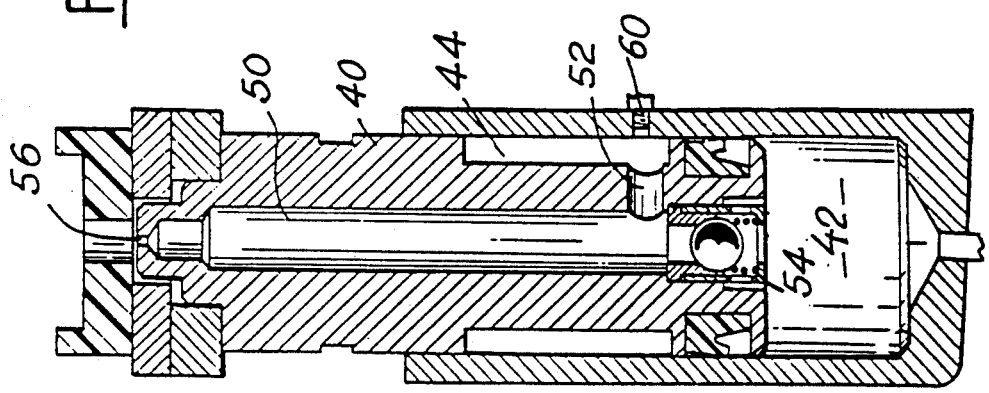
FIGS. 4A and 4B represent a sectional view of a tightener having a valve respectively in a position of rest and a working position, as employed in the invention.
Figure 4A:
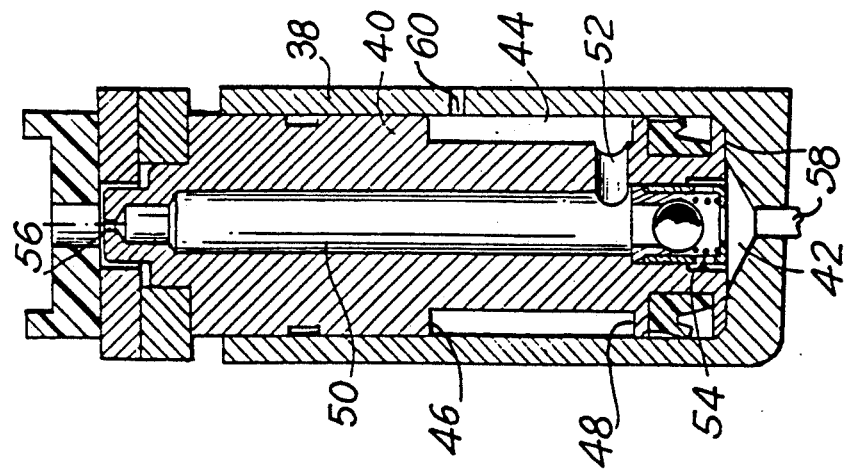

Shown in FIG. 1 is a device for driving in rotation a camshaft for the opening and closing of valves in an explosion engine in the manner known in the prior art. This device 10 comprises a driving shaft 12, in this instance the crankshaft cooperating with a chain 16 so as to drive a driven shaft 14 which is in this instance the camshaft. This driving is achieved through chain wheels fixed to the shafts but, for reasons of simplification, a single reference character will designate the shaft and the chain wheel fixed thereto.

In this device, the chain portion 18 on the upstream side of the crankshaft relative to the direction of rotation symbolically represented by the arrow 22, operates under tension and is termed the tight side. The chain portion 20 located on the downstream side of the crankshaft is termed the slack side.

A chain tightening system 24, constituted by a shoe 26 pressed against the slack side of the chain by a jack 28, takes up the initial play and the play due to wear. The shoe 26 may be formed by a strip rotatively mounted on a pin 30 so as to have a lever effect. Hereinafter, the jack 28 without the shoe 26 will be termed the tightener.

In this Figure, there have been designated by O and O' the positions of references carried by the shafts 12 and 14. It is found that, in this device, the rotation of the crankshaft 12 drives the chain which itself rotates the camshaft 14, this type of transmission ensuring a perfect synchronism, but a fixed setting, of the angular position of the camshaft as a function of the angular position of the crankshaft.

Shown in FIG. 2 is a device 32 according to the invention which comprises a crankshaft V, a driven shaft A1, a chain 16 having a slack side BM and a tight side BT. This device also includes a tightener T1 cooperating with the slack side and a second tightener T2 cooperating with the tight side BT.

Shown in FIGS. 2 and 3 are respectively the initial positions and the positions with a maximum angular offset, and the corresponding hydraulic circuit.

The hydraulic circuit comprises a supply of fluid under pressure from the oil pump P of the internal combustion engine, as is known in the prior art. The oil under pressure therefore enters the tighteners T1 and T2 through the supplies 60. Disposed on the downstream side of the tighteners are electrically-operated valves EV1 and EV2, then, on the downstream side of these electrically-operated valves, throttles R1 and R2. At the outlet of these throttles the fluid returns to the oil sump 62 located on the upstream side of the oil pump P.

First of all it is necessary to described the type of tightener employed.

Such a tightener has been described in detail in the patent application No. 87 01 553 in the name of the Applicant.

Such a tightener comprises a jack body 38 in which is slidable a piston 40 so as to define a chamber 42. The piston 40 is recessed between shoulders 46 and 48 so as to define with the inner wall of the body 38 a chamber 44. The piston further comprises a central and longitudinal passageway 50 in communication with said chamber 44 through an orifice 52. Disposed at the lower end of the piston which defines with the body 38 the chamber 42, is a valve 54 which permits controlling the passage between the longitudinal passageway 50 and the chamber 42. This valve 54 is adapted to permit the passage from the passageway 50 to the chamber 42 while it precludes the passage in the opposite direction of circulation.

Provided at the other end of the passageway 50 is a bore 56 permitting an escape of oil and consequently simultaneously the lubrication of the chain.

Furthermore, the body of the jack 38 is provided with an outlet 58 in its lower part.

This jack body 38 also includes an orifice 60 for supplying fluid under pressure to the chamber 44.

This hydraulic device operates in the following manner: in the state of the device shown in FIG. 2, the oil pump supplies oil under pressure to the chambers 42 of the tighteners T1 and T2 and the electrically-operated valves EV1 and EV2 are respectively in a closed and open position. In this way the chamber 42 of the tightener T1 is at the supplied pressure. In this way, the chamber 42 of the tightener T1 is at the pressure supplied by the pump P, while the chamber 42 of the tightener T2 is substantially at atmospheric pressure, since the electrically-operated valve TV2 is open and allows the discharge of the fluid supplied by the pump to the engine sump 62.

The throttles R1 and R2 are of the adjustable type and permit progressively varying, as a function of the running speed of the engine, the escape of the pressure previously established in the chambers 42 of the tighteners T1 and T2. In the initial position shown in FIG. 2, the throttle R2 is in a progressively opened position so that the tightener T2 exerts no force on the tight side BT of the chain 16. The throttle R1 is in a progressively closed position.

Represented in FIG. 3 is the device in its position of maximum variation of the angular setting between the driven shaft A1 and the crankshaft V.

In order to enable the tightener T2 to exert maximum pressure on the tight side BT, it was previously necessary to cause the tightener T1 to move to the retracted position. For this purpose, the hydraulic circuit having the two tighteners T1 and T2 suppplied at the output pressure of the hydraulic pump P, electrically-operated valves EV1 and EV2 are shifted in sequences (EV1 and then EV2) to positions which are the opposite of those represented in FIG. 2, namely the electrically-operated valve EV1 is open and the electrically-operated valve EV2 closed. The throttles R1 and R2 are then respectively in the progressively opened and closed positions, the throttle R1 in the progressively opened position permits the passage of the fluid to the engine sump 62.

The device according to the invention may also operate in an interactive manner, i.e. with the aid of an electronic control unit which records by means of sensors one or more parameters of the operation of the engine and which, as a function of these parameters, effects a progressive and constant variation of the angular dephasing or offset in order to satisfy the optimal adjustment previously stored in this unit. When this optimum is reached, for example, for an intermediate setting between O' and O'', the control unit closes the electrically-operated valve EV1, which terminates the sequence.

This electronic control unit is represented in this FIG. 2 in which it carries the reference character 63. It receives through the connection 64 the variations of the engine operating conditions recorded by means of the sensor 66 which, bearing in mind the stored value of the necessary offset for an optimal operation of the internal combustion engine, sends through the connections 68 and 70 the signals controlling the electrically-operated valves EV1, EV2 and the throttles R1 and R2.

Figure 5:
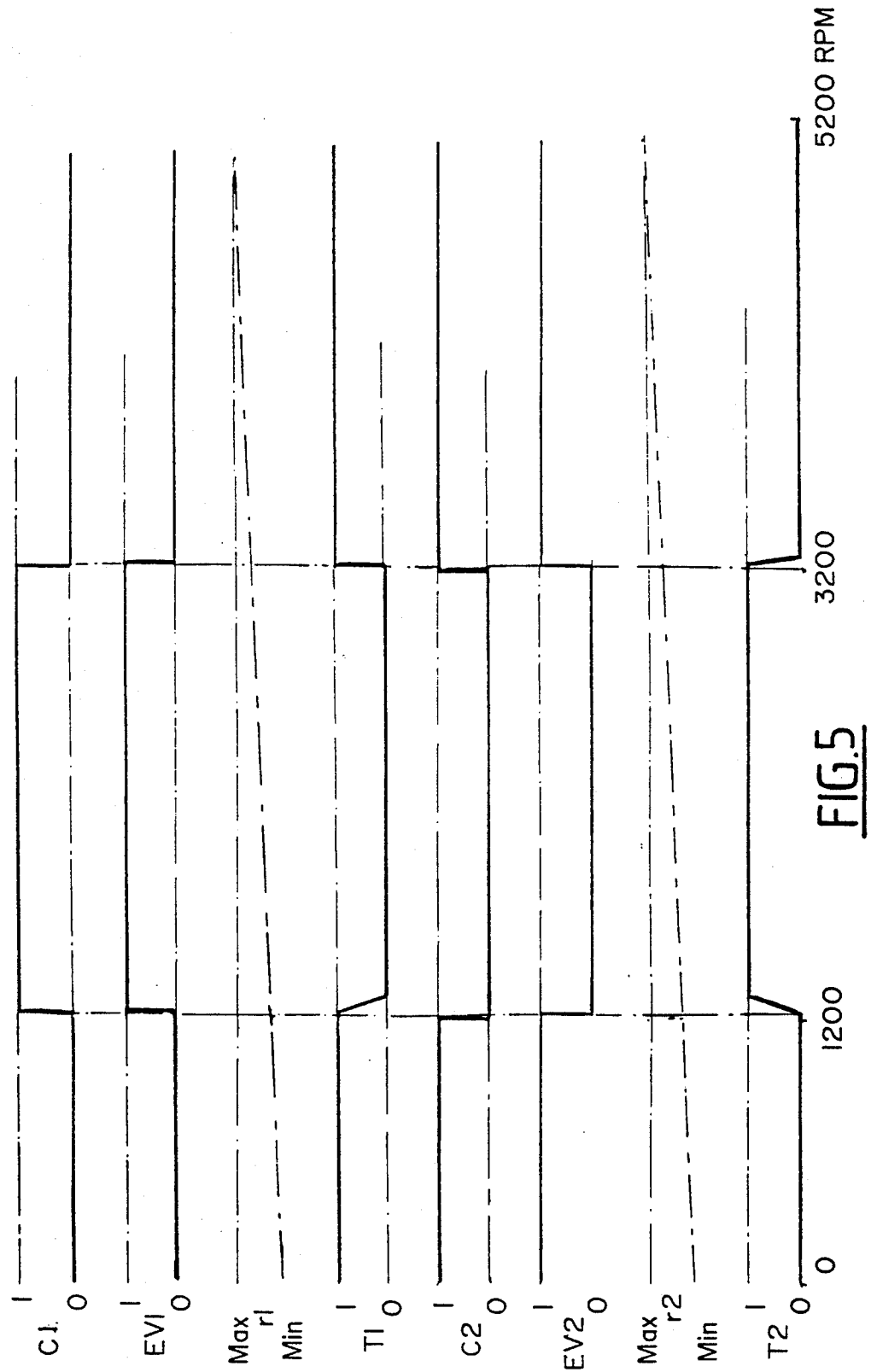
FIG. 5 represents a chart of the sequences for controlling a device having a driven shaft and a driving shaft according to the invention.

FIG. 5 illustrates by means of a graph the sequences of operation of the different elements of the hydraulic circuit, namely the tighteners T1 and T2, the throttles R1 and R2, the electrically-operated valves EV1 and EV2, and the position of the electric contacts which control them. This representation is effected in accordance with the engine operating conditions in the case of a single camshaft directly driven by the crankshaft. The device therefore solely comprises two tighteners and the associated hydraulic elements.

As shown in the graph of FIG. 5, the contact C1 corresponds to the control of the electrically-operated valve EV1 and this contact is open so long as the engine operating conditions are between for example 0 and 1200 rpm, the electrically-operated valve EV1 is in the closed state. The tightener receives the whole of the pressure and is in state 1, i.e. it exerts a force on the chain. As concerns the throttles, they are a priori in the closed state when the engine has stopped and completely open when the engine is operating at full speed 5200 rpm.

At the same time, the electric contact C2 of the electrically-operated valve EV2 is closed, which results in the opening of the electrically-operated valve and ensures the discharge of the fluid under pressure of the chamber 42 of the tightener which no longer exerts any pressure, for example between 0 and 1200 rpm, while the throttle ensures a very great slowing down of the escape of oil from the chamber of the tightener. At 1200 rpm for example, the closure of the contact of the tightener T1 may occur, which results in the opening of the electrically-operated valve EV1 of the tightener T1. The pressure exerted by the latter will decrease down to a zero value, the throttle ensuring a slowing down of the escape of fluid from the chamber of the tightener.

In a sequential and symmetrical manner the tightener T2 exerts a pressure on the chain in such a manner as to compensate for the action of the tightener T1 and for this purpose the contact C2 is opened, which closes the electrically-operated valve EV2 and puts the chamber 42 of the tightener T2 under pressure. At 1200 rpm there is therefore a variation in the angular setting of the camshaft relative to the crankshaft, this camshaft maintaining this offset up to 3200 rpm for example at which the initial setting values are for example resumed, i.e., a zero offset between the camshaft and the crankshaft. Any other value of offset and/or threshold of speed may be chosen. The example has been intentionally simplified in order to render it more easily understood. In the last range of from 3200 rpm to 5200 rpm it is found that the throttle has continued to open so that the fluid may be discharged more rapidly bearing in mind that the actions of the tighteners on the chain must occur within shorter time intervals.

The chart illustrates the sequences as a function of the speeds but, for each type of engine and in accordance with the efficiency characteristics required, an adjustment of the control of the throttle may be chosen in a different way in order to combine the different parameters such as the torque or speed for example. Likewise, the range of variation of the angular offset up to 10° for example may differ in accordance with the type of engine. Within this range, the offset may be limited by the utilization of signals from the control unit delivered as a function of an engine parameter such as:

torque, speed, pressure in the intake pipe, temperature of the exhaust gases, nitrogen oxide, etc.

Figure 6:
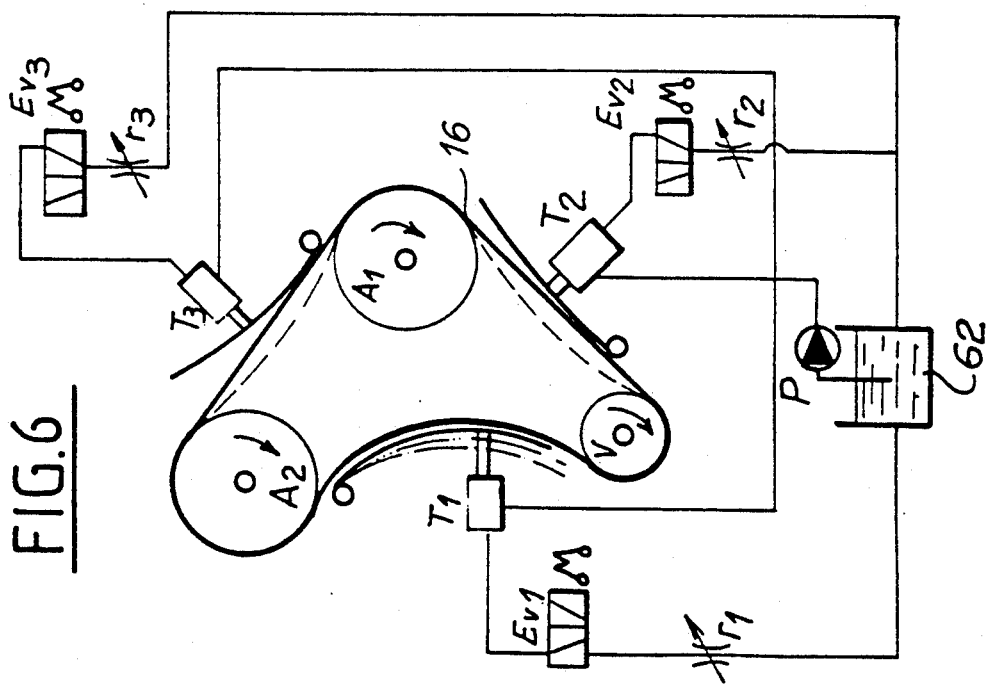
FIG. 6 represents a device according to the invention having two driven shafts and one driving shaft and its associated hydraulic circuit.

Shown in FIG. 6 is a device according to the invention comprising two driven shafts A1 and A2 driven by the same crankshaft V through the same chain 16.

In this device, the tight side BT1 is defined by the chain portion located between the crankshaft V and the first driven shaft A1 on which the tightener T2 acts. The second tight side BT2 is defined by the chain portion located between the first and second driven shaft on which the tightener T3 acts and the slack side BM is defined by the chain portion located between the second driven shaft A2 and the crankshaft V on which the tightener T1 acts.

An associated hydraulic circuit comprises for each tightener an electrically-operated valve EV and a throttle R whose reference character is identical to that of the tightener. As described hereinbefore, the hydraulic circuits are completed by an oil pump P and the engine oil sump 62.

The operation of this device having two driven shafts driven by the same crankshaft permits several types of adjustment:

the simultaneous variation of the setting of two shafts relative to the crankshaft for the same angle value: in this case, the tightener T3 does not intervene and only the tightener T1 is put under pressure and the tightener T2 is released so as to compensate and maintain the tension in the chain, the length of the tight side BT1 is therefore increased by decreasing the length of the slack side BM. This consequently has for effect to simultaneously vary by the same angle and in the same direction the setting of the two driven shafts relative to the crankshaft;

the variation in the angular setting of the first driven shaft A4 relative to the crankshaft while maintaining the initial setting of the second driven shaft A2 relative to this crankshaft: in this case, the length of the slack side remains unchanged and the same is true of the position of the tightener T1, while the tighteners T2 and T3 are acted upon. Indeed, the tighteners T2 and T3 are acted upon in such manner as to increase the length of the tight side BT1 and the length of the tight side BT2 is decreased, which causes an angular offsetting of the first driven shaft relative to the crankshaft without modification of the adjustment of the second driven shaft A2;

the variation in the angular setting of the second driven shaft A2 relative to the crankshaft without modification of the initial setting of the first driven shaft A1: in this case only the tighteners T1 and T3 intervene, the tightener T3 is put under pressure for increasing the length of the tight side BT2 and the tightener T1 has its pressure reduced so as to reduce the length of the slack side B1. Thus the driven shaft A2 undergoes an angular offset without the first driven shaft A1 undergoing any offsetting relative to its initial setting;

the simultaneous variation in the setting of the two driven shafts A1, A2 relative to the crankshaft by a different value for each of the driven shafts: in this case, the three tighteners are actuated in such manner that the lengths of the two tight sides BT1 and BT2 are increased, while the length of the slack side BM will be decreased by the amount corresponding to the increase in the length of the two tight sides.

The operation of the hydraulic circuit is the same as before, namely the electrically-operated valves EV1, EV2, EV3 operate in a completely open or completely closed manner and the escape flow is slowed down by means of throttles located on the downstream side of these electrically-operated valves which are themselves adjustable in such manner as to obtain intermediate positions. When this position is obtained, the tightener is fixed in position by the closure of the electrically-operated valve.

Figure 7:
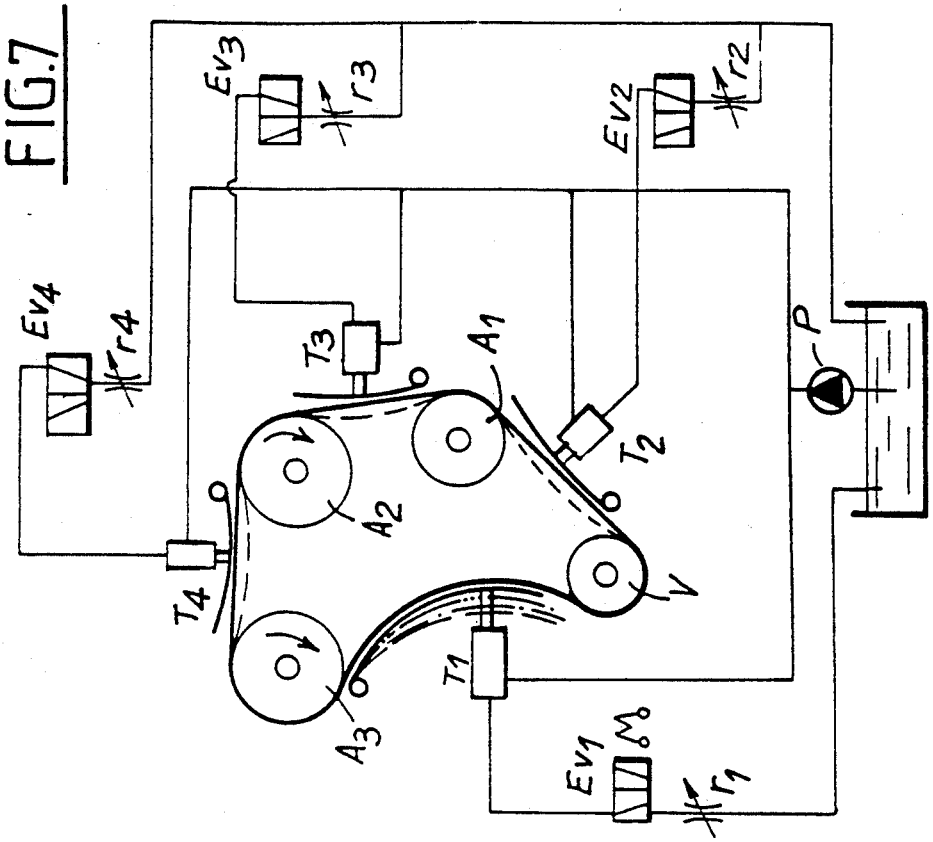
FIG. 7 represents a device having three driven shafts and one driving shaft and the associated hydraulic device.

FIG. 7 represents an embodiment in which the device comprises three driven shafts, for example two camshafts and an injection pump shaft driven by the same crankshaft through the same chain 16. In this device, it is also possible to adjust the angular setting of each shaft, of two shafts or of three shafts, independently relative to the crankshaft, by means of four tighteners T1, T2, T3, T4 respectively disposed on the first tight side BT1, on the slack side BM, on the tight side BT2, and on the tight side BT3.

The operation is identical to the device shown in FIG. 6, it being necessary to provide in such a device a sufficient amplitude of the action of the tightener T1 to compensate for the sum of the variations in length of each of the tight sides.

In the different represented embodiments, the driven shafts A1, A2 and A3 may be either camshafts or shafts for rotating an injection pump.

Shown diagrammatically in FIG. 8 is an electronic control unit 63 having its input connected to a sensor 79 detecting the speed of the engine. Other sensors of parameters of operation may be connected to the unit 63 as already indicated.

The data 81 delivered by the sensor 79 are received in a sensor-processor interface 80 connected to a microprocessor 83 which sends, with the aid of a data processing program, signals to a processor-bleeder means interface 85. The interface 85 sends control signals 86 and 87 in the form of electric pulses to the electrically-operated valves EV1 and EV2 and to the adjustable throttles R1 and R2 of two respective tighteners T1 and T2.

The signals 86 controlling the electrically-operated valves EV1 and EV2 cause the passage of the latter from the open position to the closed position or inversely.

The signals 87 control the opening of the variable throttles R1 and R2.

With reference to FIG. 9A, it is clear that, in the initial state (zero time) the electrically-operated valve EV1 is closed and the chamber 42 of the tightener T1 is under pressure, the piston 40 of the latter projects by a distance termed the travel of the tightener which has moved out. On the other hand, electrically-operated valve EV2 is open and as the bleeding has occurred, the tightener T2 is retracted (its travel is zero). The position is therefore that shown in FIG. 2.

If at time t1 the parameters indicate that a maximum offset is necessary, the electrically-operated valve EV1 is opened and the travel of the tightener T1 decreases along a rectilinear part of the corresponding curve, the slope of which is determined by the adjustment of the variable throttle R2 controlled by the control unit. The travel becomes zero at the end of a time equal to t3−t1.

At instant t2 after t1 and before t3, the electrically-operated valve EV2 is closed, which puts the chamber 42 of the tightener T2 under pressure and causes the latter to move out as shown in a part of an inclined straight line on the corresponding curve, the slope of this part of a straight line being a function of the rate at which the pressure in the chamber 42 increases. Note that the slack side is at this moment sufficiently slack to permit the tightener T2 to move out. Thus the action on the throttle R1 is such that the tightener T1 is retracted before the tightener T2 has completely moved out (i.e. t3 precedes t4).

Represented in FIG. 9B is the action of the control unit 63 of FIG. 8, this action being interrupted before the time t3. In this case, the interruption is brought about at the instant t-5 which occurs after t2 but before the time t3 of FIG. 9A which corresponds to the complete retraction of the tightener T1. In this case, the travels of the tighteners T1 and T2 are both intermediate between the retracted position or the extended position and establish an intermediate offset between the initial offset and the maximum offset.

The flowchart shown in FIG. 10 shows that the program inserted in the microprocessor 83 of FIG. 8 comprises:

a step 90 for the initialization of the setting position, a step 91 for reading the data delivered by the sensors, a step 92 for choosing the position as a function of the data delivered by the sensors, a testing step 93 which compares the actual position with the chosen position. In the case where these two positions correspond, the data delivered by the sensor are fed back to step 91. If the two positions do not correspond, the program passes to the following step, a step 94 for changing the position of the setting, a stopped engine test step 95. In this step the program checks whether the engine has stopped. When the engine has not stopped, the program is fed back to step 91. In the case where the engine has stopped, the program passes to the following step, i.e., an end of program step 96.

The invention just described employs a chain mounted on chain wheels, but the invention is also applicable to devices which employ toothed belts and toothed pulleys in the same way as devices which employ smooth belts and smooth pulleys, provided there is no slip between the belts and the pulleys.

I claim:

1. Device for driving at least one driven shaft (A1), by means of a driving shaft (V), comprising a closed-loop transmission connection of constant length defining a slack side (BM) on which a first tightener acts and at least one tight side (BT) on which a corresponding tightener (T2) acts, characterized in that the tighteners are hydraulic tighteners having a valve each comprising a chamber (42) continuously supplied with control fluid under pressure and provided with bleeder means controlled by a sequential control unit for varying the angular setting of the driven shaft relative to the driving shaft.

2. Device according to claim 1, characterized in that the bleeder means of each tightener comprise an electrically-operated valve (EV) on the downstream side of an outlet (58) of the chamber (42) and a variable throttle (R) located on the downstream side of the electrically-operated valve and on the upstream side of a bleeder reservoir (62).

3. Device according to claim 1, characterized in that the control unit comprises an input processor (80) connected to sensors (79) of parameters of operation of the engine, and a microprocessor (83) and an output processor (85) delivering control signals to the bleeder means.

4. Device according to claim 3, characterized in that the control unit sends in a sequential manner control signals to the bleeder means, which open first of all the electrically-operated valve (EV1) of the side or sides to be shortened, then, in closing the electrically-operated valve (EV2) of the side or sides to be lengthened, then, in closing the previously-opened electrically-operated valves for fixing the setting in the desired position and, in adjusting during the opening sequence the throttle or throttles for adjusting the rate of shortening of the side or sides to be shortened.

5. Device according to claim 3, characterized in that the sensors connected to the control unit comprise sensors of torque, speed, pressure in the intake pipe, temperature of the exhaust gases, content of nitrogen oxide or other elements.

6. Device according to any one of the claims 1 to 5, characterized in that the driven shaft (A1) is a camshaft or a shaft driving in rotation of an injection pump.

7. Device according to any one of the claims 1 to 5, characterized in that the closed loop connection (16) is a roller chain cooperating with chain wheels carried by the shafts (A).

8. Device according to any one of the claims 1 to 5, characterized in that the closed loop connection of constant length is a belt cooperating with pulleys.

9. Device according to claim 8, characterized in that the belt is toothed and the pulleys are toothed.

10. Device according to claim 1, 2, 3, 4, or 5, characterized in that the fluid under pressure controlling the tighteners is the lubricant under pressure of the engine and the bleeding is effected by return to the sump of an internal combustion or explosion engine.

11. Device according to claim 1, 2, 3, 4, or 5, characterized in that the fluid under pressure controlling the tighteners is a fluid distinct from the engine lubricant and the bleeding is effected by return to a sump independent of the internal combustion or explosion engine.

* * * * *

UNITED STATES PATENT AND TRADEMARK OFFICE
CERTIFICATE OF CORRECTION

PATENT NO. : 5,159,904

DATED : November 3, 1992

INVENTOR(S) : Alain F. C. Ingold

It is certified that error appears in the above-identified patent and that said Letters Patent is hereby corrected as shown below:

On the title page, Item [73], please add

Assignee — SACHS INDUSTRIES S.A. (HURET ET MAILLARD REUNIS) —

Attorney, Agent, or Firm —Trexler, Bushnell, Giangiorgi & Blackstone, Ltd —

Signed and Sealed this

Twenty-sixth Day of October, 1993

*Attest:*

BRUCE LEHMAN

*Attesting Officer*  *Commissioner of Patents and Trademarks*